Jan. 15, 1957     O. H. BANKER     2,777,551
SPRAG MECHANISM
Filed Dec. 24, 1954
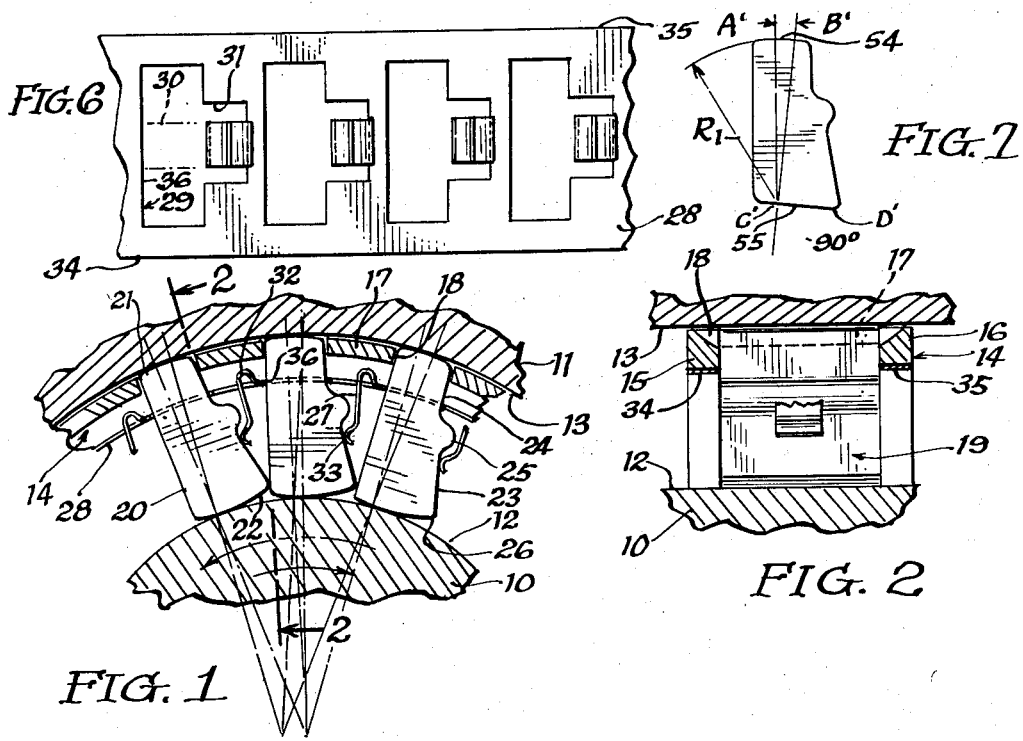
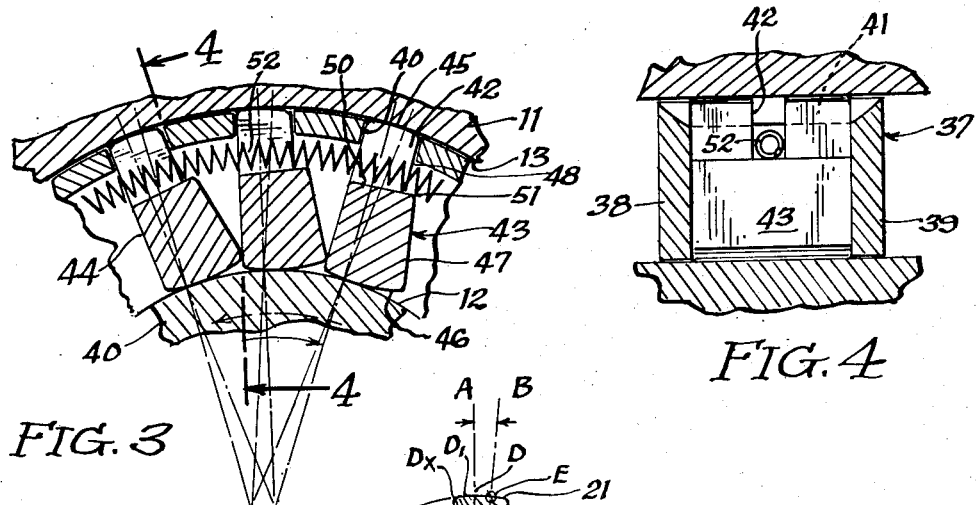
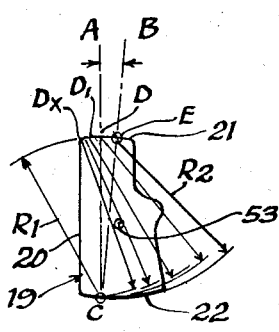
INVENTOR.
Oscar H. Banker
BY Charles J. Vrtech
Att'y

United States Patent Office 2,777,551
Patented Jan. 15, 1957

2,777,551
SPRAG MECHANISM

Oscar H. Banker, Evanston, Ill., assignor to New Products Corporation, Skokie, Ill., a corporation of Delaware Application December 24, 1954, Serial No. 477,454

17 Claims. (Cl. 192—45.1)

This invention relates to sprag mechanisms such as are used to provide a one-way connection between relatively rotatable machine elements.

Sprag mechanisms have been proposed for use as one-way clutch or one-way brake devices wherein the driving element is connected to the driven element when the driving element tends to rotate faster than the driven element but is free of any driving connections when it tends to rotate at a lesser speed than the driven element. In the case of a brake, the connection is made when the driving element tends to rotate in one direction and is broken when the driving element tends ot rotate in the opposite direction.

A sprag mechanism is a specific form of one-way connecting device and involves the use of concentrically arranged spaced cylindrical surfaces, one on the driving element and one on the driven element, and a plurality of radially extending struts or sprags interposed between the cylindrical surfaces and having radial outer and inner surfaces so formed as to change the radial dimension of each sprag as it is tilted in one direction or the other in a plane transverse to the axis of rotation of the members. The change in the radial dimension is relied upon to establish or destroy a driving connection between the cylindrical surfaces of the driving and driven elements. A cage is usually provided for the sprags to hold them in spaced relation, and energizing means, such as a spring, is used to bias the sprags in a direction to engage both the inner and outer cylindrical surfaces.

Since all one-way devices are in effect wedges which provide the frictional force necessary to form a connection between the driving and driven members of the clutch or brake, the forces created at the point or points of contact between the sprags and the inner and outer cylindrical surfaces are considerable. It is desirable therefore to have as many sprags as possible in any given one-way device so that the load may be distributed among a maximum number of units and the unit loading on the surfaces may be correspondingly reduced. In designs heretofore proposed, however, the presence of the cage constituted a limiting factor in the increase in the number of sprags possible in any given one-way device since the cage, in order to have sufficient strength to perform its desired function had to have an appreciable circumferential dimension which reduced the space available for the sprags.

Another important factor in the design of one-way driving or holding devices is the ability of the device to release quickly when the speed of the driving member is reduced below the speed of the driven member, or when the relative direction of rotation of the two elements of the one-way device is reversed. Since the one-way devices operate on a wedging principle, it is possible, in an improperly or poorly designed one-way device, to have the sprags or other active holding elements jam in a holding position so that they cannot subsequently be released under the forces normally encountered in a releasing direction.

In my prior Patent No. 2,504,173 for Overrunning Clutch, dated April 18, 1950, I describe a construction of an over-running clutch (i. e., one-way holding device) wherein the wedging action changes in accordance with the relative positions of the wedging members and the cam member used therewith in such a way that a substantially uniform transmission of radial clutching force is effected through the rollers regardless of the load imposed on the clutch and wherein is eliminated the likelihood of such severe wedging of the rollers between the driving and driven members as would result in failure to release the drive when the direction of driving force in reverse is eliminated. The principle therein disclosed, however, has not been applied to a sprag type of mechanism heretofore.

An object of this invention is the provision of a sprag mechanism which permits the use of a greater number of wedging devices or sprags per inch of circumference of the inner member of the sprag mechanism than was heretofore possible.

Another object of this invention is the provision of a sprag mechanism which provides uniform release of radial clutching force through the sprag regardless of the load imposed upon the mechanism.

Another object of this invention is the provision of a sprag type of one-way connecting device which may be readily assembled and which, after assembly, holds all of the sprags substantially in place so that the assembled sprags may be carried from place to place conveniently.

A feature of this invention is a cage for circumferentially spacing the sprags of a sprag type of holding device, the cage having spaced inner and outer cylindrical surfaces which act as bearing surfaces when the sprags are in a non-wedging or released position.

Another feature of this invention is a sprag design wherein, when the relative direction of rotation is such that the sprags are in a non-wedging position, they are acted upon by centrifugal force to rotate them still further in a non-wedging direction to the point where contact between the sprags and the inner cylindrical surface of the mechanism ceases, thereby reducing wear on the sprags and on the inner cylindrical surface and minimizing the formation of slight indentations on the inner ends of the sprags which might interfere with the normal operation of the sprags.

Yet another feature of this invention is the provision of an energizing device for the sprags which is simple to make and which cooperates with the sprags in such a manner as to tend to hold them in assembled relation as well as to rotate them about their individual axes to a wedging position.

These and other objects and features of this invention will become apparent from the following detailed description when taken together with the accompanying drawings in which:

Fig. 1 is a fragmentary side elevation in section of a sprag mechanism constructed in accordance with this invention;

Fig. 2 is a fragmentary section taken transversely of the sprag mechanism substantially along the line 2—2 of Fig. 1;

Fig. 3 is a fragmentary side or end elevation in section of a modification of the sprag mechanism of Fig. 1;

Fig. 4 is a fragmentary transverse section through the sprag mechanism of Fig. 3 taken in the direction of the line 4—4 of Fig. 3;

Fig. 5 is a diagram showing the generation of the contacting surfaces of a single sprag made in accordance with this invention, and the relationship between the said surfaces;

Fig. 6 is a plan view of a fragment of the resilient energizing means for the sprag mechanism of Fig. 1 in an intermediate stage of its construction;

Fig. 7 is a diagram showing the generation of the surfaces of a further modification of the sprag of Fig. 1; and Fig. 8 is a diagram showing the variable wedge angle provided by a sprag constructed in accordance with Fig. 7.

Referring now to the drawings for a detailed description of the invention and particularly to Figs. 1 and 2, the two members to be coupled by the sprag mechanism of this invention are shown at 10 and 11. These members may be portions of other mechanisms such as gears, shafts, housings or the like, or they may be inner and outer races specifically designed to be a part of and to be transported as a unit with the sprag mechanism. Both members may at times be rotatable so that the sprag mechanism operates as a clutch, or one of the members may be fixed against rotation while the other at times rotates in one direction and at other times tends to rotate in the opposite direction, the sprag mechanism serving to arrest the rotation of the latter member in the opposite direction and thus function as a brake mechanism. Either member may be the driving member and either member may be a stationary member while the other is a rotating member. For maximum efficiency, however, it is desirable that member 11 be a rotatable member and that it be the driven member when the mechanism operates as a clutch. The reasons for so using the members will become apparent hereinafter. To simplify the description of the sprag mechanism, member 10 will be considered as a driving rotating mechanism and 11 will be considered as a driven rotating mechanism.

Driving member 10 is formed with an external cylindrical surface 12 and driven member 11 is formed with an inner cylindrical surface 13, the surfaces being concentrically arranged and in nested relation so as to form an annular space therebetween. Disposed in the space between surfaces 12 and 13 is a cage 14 made in the form of an inverted channel as viewed in Fig. 2 and having continuous radially inwardly extending parallel sides 15 and 16 connected by a cylindrical central web 17. At points equidistantly spaced from one another around the periphery of web 17 are milled axial slots 18 in which are received the radially outer ends of the sprags 19 which connect members 10 and 11 when properly angularly related with respect thereto.

The sprags 19 are formed with identical cross sections and preferably from a hardened steel rod into which the desired contour has been rolled, the rod being then cut into lengths corresponding substantially to the axial dimension of each sprag. One side 20 of each sprag is made substantially flat while the outer end 21 and inner end 22 are made convex in the manner determined by the diagram shown in Fig. 5.

Referring now to Fig. 5, it may be assumed that line AC is a radius of the sprag mechanism passing through a sprag at some distance to the right as viewed in Fig. 5 of surface 20, and that line BC is drawn at an angle with respect to line AC, the angle being the desired wedge angle to be used between the sprags and the surfaces 12 and 13. Surface 21 is then generated by striking an arc from the center C the radius of which is equal to the distance CD on line AC and passing the arc lengthwise (axially) of the sprag. Surface 22 is generated by striking an arc through C using the point E as a center, point E being determined by the intersection of surface 21 with line BC. It will be observed from Fig. 5 that, using point D as a center and using DC as a radius, the arc struck from center D will be spaced from an arc struck from center E, using CE as a radius, by progressively and uniformly increasing increments. If the two arcs were to be developed as straight lines as shown in Fig. 8, line F representing the arc struck from D and line H the arc struck from E, they would represent the wedge angle FOH (O being the intersection of lines F and H). It is understood, of course, that as a sprag 19 tilts with respect to a radius of the sprag mechanism under the influence of driving forces, the contact points between each surface 21 and 22 and its corresponding cylindrical surface 13 and 12, respectively, changes so that new centers $D_1$—$D_x$ must be used from which to strike the arcs having radius CD. The distance of various points along these latter arcs from the arc struck using CE as a radius when plotted on the graph shown in Fig. 8, produces the curve G, from which it is apparent that a variable wedge angle is produced by the sprag construction and contour shown in Figs. 1 and 5. This increasing wedge angle prevents wedging lock regardless of the load on the sprag, since the greater the load, the greater the tipping of the sprag with respect to radius DC and the greater the resulting wedge angle which if properly selected renders such wedge locking action virtually impossible.

Referring again to Fig. 1, the side of each sprag 19 opposite the relatively flat side 20 has an outwardly converging (relative to side 20) relatively flat portion 23 at its radially inner end, and a substantially parallel portion 24 at its radially outer end, the two portions being connected by a bead 25. The outer end of each sprag, defined by side 20, outer surface 21 and portion 24, is received in slots 18 of cage 14 so that the outer ends of the sprags are equidistantly spaced by the cage. The inner ends of the sprags are wider in a circumferential direction than the outer ends, the width being so selected that the corner 26 formed by the intersection of inner surface 22 and portion 23 of one sprag touches surface 20 of the adjacent sprag when the sprag mechanism is in operation. This insures that the entire outer periphery 12 of member 10 is taken up by sprags and hence no space is wasted on holding mechanisms and energizing mechanisms for the sprags themselves. Furthermore, by establishing contact between the sprags the energization of one sprag and its resultant tipping with respect to the radius is transferred immediately to the adjacent sprag and so on around the entire sprag mechanism, thus insuring the proper functioning of each sprag to carry its share of the load.

In addition to the self-energization of the sprags by contact with one another, the sprags may be energized and also held in place against radial inward displacement relative to one another by a plurality of spring fingers 27 which may be formed as an integral part of a ribbon 28 of spring steel. As shown in Fig. 6 ribbon 28 is preferably punched while in the flat stage to form a substantially rectangular opening 29 large enough to receive the outer portion of a sprag and to form an opening 31 adjacent opening 29. A tongue 30, shown in dotted lines in Fig. 6, is formed simultaneously with openings 29 and 31 and extends into opening 29 from the side of adjacent opening 31, the tongue 30 subsequently being bent downwardly as shown in Fig. 1 to form spring finger 27. The bend 32 is well rounded to prevent a concentration of stress thereat, and the free end 33 is likewise rounded so that said end 33 may be slid over bead 25 as a sprag is pushed radially outwardly with respect to ribbon 28 during the assembly of the sprag mechanism. Sides 34 and 35 of the ribbon are continuous, and when an appropriate length of ribbon 28 is cut and curled to fit within cage 14, the ribbon will expand and side 34 will overlie the inner end of side 15 of cage 14, and similarly, side 35 will overlie the side 16 of said cage. The radial position of ribbon 28 in the sprag mechanism is therefore determined by the sides of cage 14.

The sprag mechanism may be assembled independently of the members 10 and 11 to be coupled thereby, a cage 14 for example being first fitted with a section of the ribbon 28, the ribbon being aligned with respect to the cage in such manner that the edge 36 of rectangular opening 29 is substantially radially aligned with the corresponding edge of milled slots 18 in the cage, and the continuous sides 34 and 35 of the ribbon 28 being axially aligned with respect to the sides 15 and 16 of the cage. Sprags 19 are then inserted into openings 29 and milled slots 18 by pushing them radially outwardly therethrough, and when each of the openings has been filled with a sprag, the entire assembly can be transported as a unit. By first inserting a tube of larger diameter than the diameter of surface 12 into the sprags to make sure that they are in a released position, the assembly can then be slipped axially into the annular space formed by surfaces 12 and 13.

It may be observed that when a sprag 19 is assembled with respect to cage 14 and ribbon 28, the end 33 of spring finger 27 pushes the lower portion of the sprag to the left as viewed in Fig. 1, and the sprag will fulcrum about the left-hand edge 36 of rectangular opening 29. A couple is thus formed tending to rotate the sprag in a clockwise direction which, as described with respect to Fig. 5, causes the sprag to contact both the outer and inner cylindrical surfaces 12 and 13, respectively, of the mechanism to establish a connection therebetween. Spring fingers 27 therefore perform the function of energizing sprags 19.

When the sprags 19 are assembled with respect to ribbon 28 and cage 14, such assembly is accomplished by forcing the bead 25 of each sprag past end 33 of each finger 27 after which the sprag is resiliently locked in place, and hence ribbon 28 performs the additional function of holding the sprags in an assembled relation in the finished sprag mechanism.

The modification shown in Figs. 3 and 4 differs from the one just described in that a different form of resilient retaining means is used and the sprags are modified accordingly. Certain additional features are present which will be described hereinafter.

Referring now to Fig. 3, the sprag mechanism depicted therein is adapted to be used with the same members 10 and 11 and the same angular space defined by external cylindrical surface 12 on member 10 and internal cylindrical surface 13 on member 11. The cage 37 is also of inverted channel section but the sides 38 and 39 preferably extend radially inwardly into close proximity to surface 12. Said cage 37 may be made of bearing bronze so that when the sprags are in a released or non-driving position the member 10 may support, or be supported by, member 11 through the sides 38, 39 of cage 37. Thus cage 37 may function as a bearing when the device is released or free wheeling.

Cage 37 has a plurality of milled slots 40 formed in the web 41 thereof to receive the outer ends 42 of the sprags 43. As in the Fig. 1 and 2 form, the milled slots 40 are just slightly larger than the outer ends 42 of the sprangs 43 so that said slots serve to space the sprags circumferentially of the mechanism.

Each sprag 43 has a substantially flat surface 44 on one side, which may be disposed in a plane parallel to a radial plane of the mechanism, and curved end surfaces 45 and 46, the contour of which is preferably formed in accordance with the theoretical considerations described with respect to Figs. 5 and 8. The side of the sprag opposite side 44 has a converging portion 47 adjacent curved end 46 and a substantially parallel portion 48 adjacent curved surface 45, the terms "convergent" and "parallel" being taken in reference to side 44.

A slot 42 is cut circumferentially of each sprag 43 from the outer curved surface 45 inwardly, the bottom 50 of the slot being so formed as to produce a corner 51 on the right-hand side of the slot as viewed in Fig. 3, which is at a greater distance from the center of curvature of surface 12 than any other portion of the bottom of the slot.

Although the modification shown in Figs. 3 and 4 provides the same self energizing characteristic brought about by contact between the radial inner ends of adjacent sprags, resilient energization is also provided by a garter spring 52 which is received in the slots 42 of the sprags and is distended so as to exert a radial inward force on each of the sprags. It may be observed that since corner 51 is farthest from the center of curvature of surface 12, spring 52 will bear with greatest force upon said corner. The corner 51 being located to the right of the geometric center of the transverse section of the sprag as viewed in Fig. 3, and particularly on a radius to the right of the radius passing through the point of contact between surface 46 and surface 12, a turning moment will be formed which will tend to rotate the sprag in a clockwise direction, that is, a direction to energize the sprags.

Referring momentarily to Fig. 5, the center of gravity of the sprag section shown there will be approximately at the point within the circle marked 53. This point is circumferentially offset with respect to the points of contact between the outer surface 21 (or 45 in the case of the Fig. 3 form) of each sprag as viewed in Fig. 5. It follows therefore that when an assembled sprag mechanism is rotated at a relatively high speed and in a direction to release the sprags, centrifugal force acting upon the center of gravity 53 will tend to rotate each sprag around its line of contact between surfaces 21 and 13, thereby eventually eliminating contact between the sprags and surface 12. This results in reduced wear between surfaces 12 and 22, since all rubbing action between them is eliminated, and the life of the sprag mechanism is therefore greatly increased.

Where a greater increase in wedge angle between the sprags for each increment of tipping of the sprag relative to a radius of the mechanism is desired, the form of inner surface for the sprag shown in Fig. 7 may be used. In that figure, using point C as a center and a radius R₁, the outer surface 54 of the sprag may be generated. Assuming an initial wedge angle such as angle A'C'B', the radially inner surface 55 is formed by erecting a perpendicular to line C'B' and passing through C'. The wedge angles produced by the operation of substantially flat surface 55 upon curved surface 12 of member 10 when surface 54 operates against cylindrical surface 13 of member 11 in the manner shown in Fig. 5 increase with each increment of tilting of the sprag away from the initial contacting position in a clockwise direction, and hence the susceptibility of the sprag mechanism to locking under heavy loads is substantially eliminated. The increase in wedge angle is shown graphically in Fig. 8 and is represented by the line G, which shows the increase in radial dimension of the sprag per unit increase in the angle of the sprag.

It may be apparent from the foregoing description that the sprag mechanisms herein described result in self-contained compact units which provide maximum distribution of the load in mechanisms due to the fact that a maximum number of sprags per inch of circumference of the inner cylindrical surface is used. This is evidenced by the fact that the inner regions of the sprags are actually in contact with one another. Furthermore, the sprag mechanisms of this invention may be designed to prevent completely the locking action under heavy loads which frequently occurs in sprag mechanisms heretofore proposed. Either form of the mechanism disclosed lends itself to easy assembly, and when the form shown in Fig. 4 is used, the sprag mechanism may be utilized as a bearing at such times when the sprags themselves are inoperative. With further reference to the Fig. 4 design it may be observed that by properly choosing the spacing between sides 38 and 39 of the cage 37 relative to the axial length of the sprags, said sprags may be held in proper parallel relation with respect to one another and with respect to the center of rotation of the device, the sides of the cage acting to guide the sprags. The sprags being of wire drawn construction are economical to manufacture and are capable of withstanding considerable abuse.

It is understood that the foregoing description is merely illustrative of preferred embodiments of this invention

I claim:

1. A sprag mechanism for establishing a driving connection between machine elements having concentric cylindrical surfaces, comprising a cylindrical cage of inverted channel shape in radial cross section and having slots in the central portion thereof, a plurality of sprags extending through the slots at their radially outer ends and contacting one another at their radially inner end regions, said sprags being adapted to contact said surfaces to establish a drive therebetween, and resilient means tending to rotate each sprag about an axis parallel to the axis of the mechanism and into wedging relation with the said concentric cylindrical surfaces.

2. A sprag mechanism for establishing a driving connection between machine elements having concentric cylindrical surfaces, comprising a cylindrical cage of inverted channel shape in radial cross section and having slots in the central portion thereof, a plurality of sprags extending through the slots at their radially outer ends and contacting one another at their radially inner end regions, each strut having a substantially curved radially outer surface for contacting one of said concentric cylindrical surfaces and a substantially plane radially inner surface for contacting the other of said cylindrical surfaces such that the wedge angle formed between the contacting surfaces of the struts and concentric cylindrical surfaces varies with the inclination of the struts relative to a radius of the mechanism, whereby the prevent locking of the mechanism in driving connection.

3. A sprag mechanism for establishing a driving connection between machine elements having concentric cylindrical surfaces, comprising a cylindrical cage of inverted channel shape in radial cross section and having slots in the central portion thereof, a plurality of sprags having parallel-sided radially outer end regions, divergent radially inner end regions, and an outer curved surface, said sprags extending through the slots to contact the outer concentric cylindrical surface, the center of gravity of each sprag being displaced from a radial plane passing through the points of contact between the outer curved sprag surface and the outer concentric cylindrical surface such that said sprags are urged by centrifugal force to rotate about said point of contact and out of contact with the inner concentric cylindrical surface, and said sprags being in contact with one another at their radial inner ends, whereby movement of one sprag is transmitted directly to an adjacent sprag to facilitate uniform energization of all of said plurality of sprags.

4. A sprag mechanism for establishing a driving connection between machine elements having concentric cylindrical surfaces, comprising a cylindrical cage of inverted channel shape in radial cross section, the sides of the channel extending radially from one of said concentric cylindrical surfaces to the other such that said sides are adapted to function as bearings for supporting one of said machine elements from the other, the connecting web of the channel between the sides having slots therein, a plurality of sprags extending through the slots at their radially outer ends and contacting one another at their radially inner ends, said sprags being adapted to contact said surfaces to establish a drive therebetween, and resilient means tending to rotate each strut about an axis parallel to the axis of the mechanism and into wedging relation with the said concentric cylindrical surfaces.

5. A sprag mechanism for establishing a driving connection between elements having concentric cylindrical surfaces, comprising a cylindrical cage of inverted channel shape in radial cross section and having slots in the web portion of the channel, the sides of the channel extending radially inwardly and having their ends spaced from the inner concentric cylindrical surface, a plurality of sprags extending through the slots at their radially outer ends and contacting one another at their radially inner ends, said sprags being adapted to contact said surfaces to establish a drive therebetween, and resilient means tending to rotate each strut about an axis parallel to the axis of the mechanism and into wedging relation with the said concentric cylindrical surfaces, said resilient means comprising a ribbon of resilient metal having perforations corresponding to the slots in the cage and adapted to receive the sprags therein, said ribbon being curled and having its sides abutting against the ends of the sides of the channel-shaped cage whereby the position of the resilient means relative to the cage may be predetermined, and resilient spring fingers on said ribbon and contacting the sprags radially inwardly of the central portion of the cage to tend to rotate each strut as aforesaid.

6. A sprag mechanism for establishing a driving connection between elements having concentric cylindrical surfaces, comprising a cylindrical cage of inverted channel shape in radial cross section and having slots in the web portion of the channel, a plurality of sprags extending through the slots at their radially outer ends and contacting one another at their radially inner ends, said sprags being adapted to contact said surfaces to establish a drive therebetween, and resilient means disposed between the web portion of the channel-shaped cage and the contacting radially inner ends of the sprags tending to rotate each sprag about an axis parallel to the axis of the mechanism and into wedging relation with the said concentric cylindrical surfaces, said means comprising a cylindrically shaped support having openings therein to receive the sprags and by which the said support is located in the mechanism, and resilient means mounted on the support and bearing against each sprag in a circumferential direction, the action of the resilient means on one sprag and the reaction of said means on the adjacent sprag tending to rotate said sprags as aforesaid.

7. A sprag mechanism as described in claim 6, said cage having sides extending radially inwardly and said support for the resilient means bearing against the inner ends of the sides of the channel and being located in a radial direction thereby in the mechanism.

8. A sprag mechanism for establishing a driving connection between machine elements having concentric cylindrical surfaces, comprising a cylindrical cage having slots in the central portion thereof, a plurality of sprags extending through the slots at their radially outer ends and contacting one another at their radially inner ends, said sprags being adapted to contact said surfaces to establish a drive therebetween, and resilient means supported by the cage and including individual spring fingers disposed between the sprags, said sprags having an axially disposed bead adjacent the spring fingers such that when a sprag is assembled relative to a cage the bead is contacted by the spring finger and distorts the spring finger as it passes thereby, said sprag being resiliently held by the spring finger after said bead has passed thereby to prevent reverse relative movement between the sprag and resilient means.

9. A sprag mechanism for establishing a driving connection between elements having concentric cylindrical surfaces, comprising a cylindrical cage having slots in the central portion thereof, a plurality of sprags extending through the slots at their radially outer ends, said sprags being adapted to contact said surfaces to establish a drive therebetween, each said sprag being narrower in a circumferential direction at the radially outer end than at the radially inner end thereof, and resilient means tending to rotate each sprag about an axis parallel to the axis of the mechanism and into wedging relation with the said concentric cylindrical surfaces, said resilient means comprising a ribbon having slots therein of a size in a circumferential direction sufficient to receive the outer end of each sprag but not the circumferentially wider inner end thereof, and spring fingers adapted to contact the sides of the sprags, each said sprag having an axially extending bead adapted to be contacted by the spring finger such that when a sprag is assembled relative to the resilient means the bead is disposed between the end of the spring finger and the ribbon.

10. A sprag mechanism as described in claim 9, said cage being of inverted channel shape in radial cross section and including sides extending radially inwardly toward the inner of the concentric cylindrical surfaces, and said ribbon being resilient and expansible outwardly against the ends of the inwardly extending sides of the cage such that said ends of the cage locate the resilient means in the sprag mechanism.

11. A sprag mechanism for establishing a driving connection between machine elements having concentric cylindrical surfaces, comprising a cylindrical cage having slots in the central portion thereof, a plurality of sprags extending through the slots at their radially outer ends and contacting one another at their radially inner ends, said sprags being adapted to contact said surfaces to establish a drive therebetween, and each of said sprags having a shoulder in a plane circumferentially offset from a plane passing through the points of contact between the sprags and said cylindrical surfaces, and resilient means bearing radially inwardly on said shoulders to establish contact between the sprags and said cylindrical surfaces.

12. A sprag mechanism as described in claim 11, the shoulder on the sprags being disposed equidistantly from the axial ends of the sprags and said sprags being relieved radially inwardly from the outer ends of the sprags circumferentially of the shoulders, and said resilient means comprising a garter spring passing through the relieved portions of the sprag and contacting the said shoulders thereof.

13. As an article of manufacture, a sprag comprising a length of rolled steel having a substantially flat side, the side opposite the flat side being substantially parallel to the flat side from one edge inward and being divergent relative to the flat side from the central region thereof to the edge opposite the said one edge, and a protuberance on the said side opposite the flat side and disposed centrally thereof.

14. An article of manufacture as described in claim 13, said protuberance comprising a bead extending from end to end of the sprag, the ends of the sprag being substantially flat and parallel to one another, and the edges being convexly curved and constituting the drive-transmitting surfaces of the sprag.

15. A sprag mechanism for establishing a driving connection between machine elements having concentric cylindrical surfaces, comprising a plurality of radially disposed sprags having radially outer and inner curved surfaces each adapted to contact one of the said cylindrical surfaces, the radially outer curved surface being of lesser circumferential extent than the radially inner curved surface, the sprags being substantially in contact with one another at their radially inner regions, a cage having slots to receive the radially outer ends of the sprags, and resilient means interposed between the cage and the contacting radially inner regions of the sprags and tending to rotate the sprags into contact with the cylindrical surfaces.

16. A sprag mechanism as described in claim 15, said resilient means acting upon a side of each sprag and creating a component of force tending to urge the radially inner regions of the sprags into contact with one another such that the sprags, cage and resilient means comprise a unitary pack.

17. A sprag mechanism for establishing a driving connection between machine elements having concentric cylindrical surfaces, comprising an annular cage having radial slots in the central portion thereof, a plurality of sprags having their radially outer ends extending through the slots and their radially inner end regions in contact with one another, said sprags being adapted to contact said cylindrical surfaces to establish a drive therebetween, and resilient means tending to rotate each sprag about an axis parallel to the axis of the mechanism and into wedging relation with the said concentric cylindrical surfaces.

References Cited in the file of this patent

UNITED STATES PATENTS

| | | |
|---|---|---|
| 2,683,509 | Jandasek | July 13, 1954 |
| 2,683,510 | Troendly | July 13, 1954 |